(12) United States Patent
Hoffman et al.

(10) Patent No.: US 11,352,183 B2
(45) Date of Patent: Jun. 7, 2022

(54) PRESSURE RELIEF VALVE WITH WETTING FLUID RESERVOIRS

(71) Applicants: Karl K. Hoffman, Arlington Heights, IL (US); Robert C. Larsen, Jr., Bartlett, IL (US)

(72) Inventors: Karl K. Hoffman, Arlington Heights, IL (US); Robert C. Larsen, Jr., Bartlett, IL (US)

(73) Assignee: Plitek, L.L.C., Des Plaines, IL (US)

( * ) Notice: Subject to any disclaimer, the term of this patent is extended or adjusted under 35 U.S.C. 154(b) by 27 days.

(21) Appl. No.: 16/809,870

(22) Filed: Mar. 5, 2020

(65) Prior Publication Data
US 2021/0276780 A1    Sep. 9, 2021

(51) Int. Cl.
*F16K 15/14*     (2006.01)
*B65D 77/22*     (2006.01)
(Continued)

(52) U.S. Cl.
CPC .......... *B65D 77/225* (2013.01); *B65D 33/01* (2013.01); *F16K 15/144* (2013.01); *F16K 24/04* (2013.01); *B65D 2205/00* (2013.01)

(58) Field of Classification Search
CPC ...... B65D 77/225; B65D 33/01; B65D 33/20; B65D 2205/00; F16K 15/144;
(Continued)

(56) References Cited

U.S. PATENT DOCUMENTS 2,927,722 A    3/1960 Metzger
2,946,502 A    7/1960 Metzger
(Continued)

FOREIGN PATENT DOCUMENTS

CA    2569303      8/2006
CA    2829452 A1   4/2014
(Continued)

OTHER PUBLICATIONS

Excerpt from PackTV Web TV Channel for Packaging. "Avery Dennison Launches Flexis Air Pre-Oiled Valve for Coffee Packs." <www.packtv.co.uk/2011/11/avery-dennison-launches-flexis-air-pre-oiled-valve-for-coffee . . . > 4 pages. Date: Copyright 2011.
(Continued)

*Primary Examiner* — Hailey K. Do
(74) *Attorney, Agent, or Firm* — Jansson Munger McKinley & Kirby Ltd.

(57) ABSTRACT

One-way pressure relief valves with wetting fluid reservoirs are disclosed. Valves of the types described herein may be applied to a product package, for example a package containing dry roasted coffee, to allow gas to escape from the package while preventing entry of ambient air into the package. A wetting fluid is provided within the valve to facilitate formation of the seal blocking entry of ambient air through the valve and into the product package. The wetting fluid reservoirs hold wetting fluid to limit or prevent leakage of the wetting fluid from the valve providing benefits such as improved application of the valves to the packages,
(Continued)

improved retention of the valves to the packages, and appearance improvements resulting from avoidance of leakage of wetting fluid onto the valve and the package to which the valve is attached.

20 Claims, 9 Drawing Sheets

(51) Int. Cl.
*B65D 33/01* (2006.01)
*F16K 24/04* (2006.01)

(58) Field of Classification Search
CPC ...... F16K 15/147; F16K 17/164; F16K 17/12; Y10T 137/788; Y10T 137/7881; Y10T 137/7895
See application file for complete search history.

(56) References Cited

U.S. PATENT DOCUMENTS

| | | | |
|---|---|---|---|
| 3,547,305 A | 12/1970 | Khoury | |
| 3,595,467 A | 7/1971 | Goglio | |
| 3,799,427 A | 3/1974 | Goglio | |
| 4,000,846 A | 1/1977 | Gilbert | |
| 4,122,993 A | 10/1978 | Glas | |
| 4,134,535 A | 1/1979 | Barthels et al. | |
| 4,206,870 A | 6/1980 | Devries | |
| 4,420,015 A | 12/1983 | Blaser | |
| 4,444,219 A * | 4/1984 | Hollenstein | B65D 77/225 137/246 |
| 4,576,285 A | 3/1986 | Goglio | |
| 4,640,838 A | 2/1987 | Isakson et al. | |
| 4,653,661 A | 3/1987 | Buchner et al. | |
| 4,705,174 A | 11/1987 | Goglio | |
| 4,890,637 A | 1/1990 | Lamparter | |
| 4,971,218 A | 11/1990 | Buchner et al. | |
| 5,263,777 A | 11/1993 | Domke | |
| 5,325,765 A | 7/1994 | Sylvan et al. | |
| 5,326,176 A | 7/1994 | Domke | |
| 5,337,179 A | 8/1994 | Hodges | |
| 5,417,743 A | 5/1995 | Dauber | |
| 5,427,839 A | 6/1995 | Buchner et al. | |
| 5,445,870 A | 8/1995 | Buchner et al. | |
| 5,496,122 A | 3/1996 | Fattori | |
| 5,515,994 A | 5/1996 | Goglio | |
| 5,553,942 A * | 9/1996 | Domke | B65D 77/225 383/101 |
| 5,584,409 A | 12/1996 | Chemberlen | |
| 5,727,881 A | 3/1998 | Domke | |
| 5,782,266 A | 7/1998 | Domke | |
| 5,829,884 A | 11/1998 | Yeager | |
| 5,840,189 A | 11/1998 | Sylvan et al. | |
| 5,869,009 A | 2/1999 | Bellefeuille et al. | |
| 5,881,881 A | 3/1999 | Carrington | |
| D408,679 S | 4/1999 | Potts et al. | |
| 5,893,461 A | 4/1999 | Walters | |
| 5,989,608 A | 11/1999 | Mizuno | |
| 5,992,635 A | 11/1999 | Walters | |
| 5,997,614 A | 12/1999 | Tuma et al. | |
| 6,070,728 A | 6/2000 | Overby et al. | |
| 6,079,315 A | 6/2000 | Beaulieu et al. | |
| 6,082,247 A | 7/2000 | Beaulieu et al. | |
| 6,142,063 A | 11/2000 | Beaulieu et al. | |
| 6,182,554 B1 | 2/2001 | Beaulieu et al. | |
| 6,214,392 B1 | 4/2001 | Ramirez | |
| 6,254,908 B1 | 7/2001 | Winters | |
| D452,433 S | 12/2001 | Lazaris | |
| D452,434 S | 12/2001 | Sweeney | |
| 6,395,073 B1 | 5/2002 | Dauber | |
| 6,440,256 B1 | 8/2002 | Gordon et al. | |
| D462,865 S | 9/2002 | Honan et al. | |
| 6,468,332 B2 | 10/2002 | Goglio et al. | |
| 6,516,482 B2 | 2/2003 | Karafa et al. | |
| D474,110 S | 5/2003 | Sweeney | |
| D474,111 S | 5/2003 | Lazaris | |
| 6,582,113 B2 | 6/2003 | Rogers | |
| 6,589,577 B2 | 7/2003 | Lazaris et al. | |
| 6,606,938 B2 | 8/2003 | Taylor | |
| 6,607,762 B2 | 8/2003 | Lazaris et al. | |
| 6,645,537 B2 | 11/2003 | Sweeney et al. | |
| 6,655,260 B2 | 12/2003 | Lazaris et al. | |
| 6,658,989 B2 | 12/2003 | Sweeney et al. | |
| 6,662,827 B1 | 12/2003 | Clougherty et al. | |
| 6,663,284 B2 | 12/2003 | Buckingham et al. | |
| 6,666,130 B2 | 12/2003 | Taylor et al. | |
| 6,672,200 B2 | 1/2004 | Duffy et al. | |
| 6,708,600 B2 | 3/2004 | Winkler et al. | |
| D489,215 S | 5/2004 | Honan et al. | |
| 6,800,106 B2 | 10/2004 | Cogar et al. | |
| D502,362 S | 3/2005 | Lazaris et al. | |
| 6,926,761 B2 | 8/2005 | Johnson et al. | |
| D513,572 S | 1/2006 | Schaffeld et al. | |
| 7,074,443 B2 | 7/2006 | Thomas et al. | |
| 7,165,488 B2 | 1/2007 | Bragg et al. | |
| 7,178,550 B2 | 2/2007 | Stotkiewitz et al. | |
| 7,178,555 B2 | 2/2007 | Engel et al. | |
| D544,299 S | 6/2007 | Schaffeld et al. | |
| 7,243,683 B2 | 7/2007 | Stotkiewitz et al. | |
| 7,244,223 B2 | 7/2007 | Hartman et al. | |
| 7,328,543 B2 | 2/2008 | Hoffman et al. | |
| 7,331,715 B2 | 2/2008 | Miller et al. | |
| 7,347,138 B2 | 3/2008 | Bragg et al. | |
| 7,360,418 B2 | 4/2008 | Pelovitz | |
| 7,377,162 B2 | 5/2008 | Lazaris | |
| 7,396,391 B2 | 7/2008 | Waida | |
| 7,398,726 B2 | 7/2008 | Streeter et al. | |
| 7,399,263 B2 | 7/2008 | Hartman et al. | |
| 7,472,524 B2 | 1/2009 | Hoffman et al. | |
| 7,490,623 B2 | 2/2009 | Rypstra | |
| 7,513,192 B2 | 4/2009 | Sullivan et al. | |
| 7,523,695 B2 | 4/2009 | Streeter et al. | |
| 7,611,557 B2 | 11/2009 | Hoffman | |
| 7,637,283 B2 | 12/2009 | Hoffman | |
| 7,640,845 B2 | 1/2010 | Woodnorth et al. | |
| 7,874,731 B2 | 1/2011 | Turvey et al. | |
| 7,922,026 B2 | 4/2011 | Westphal | |
| D637,484 S | 5/2011 | Winkler | |
| 7,967,509 B2 | 6/2011 | Turvey et al. | |
| D647,398 S | 10/2011 | Winkler | |
| D647,399 S | 10/2011 | Winkler | |
| 8,038,023 B2 | 10/2011 | Moore et al. | |
| 8,082,644 B2 | 12/2011 | Hoffman et al. | |
| 8,112,971 B2 | 2/2012 | Newrones et al. | |
| 8,151,694 B2 | 4/2012 | Jacobs et al. | |
| 8,177,700 B2 | 5/2012 | Newrones et al. | |
| 8,522,926 B2 | 9/2013 | Hoffman et al. | |
| 8,636,034 B2 | 1/2014 | Hoffman et al. | |
| 8,746,281 B2 | 6/2014 | Morin | |
| 8,783,292 B2 | 7/2014 | Hoffman et al. | |
| 9,187,229 B2 | 11/2015 | Hoffman et al. | |
| 9,821,528 B2 | 11/2017 | Hoffman et al. | |
| 10,358,275 B1 | 7/2019 | Cramer et al. | |
| 2004/0035783 A1 | 2/2004 | Strohm et al. | |
| 2004/0050437 A1 | 3/2004 | Engel et al. | |
| 2004/0079419 A1 | 4/2004 | Taylor et al. | |
| 2006/0050999 A1* | 3/2006 | Blythe | B65D 33/2591 383/63 |
| 2007/0090109 A1 | 4/2007 | Gustavsson | |
| 2008/0041663 A1 | 2/2008 | Hoffman et al. | |
| 2009/0145841 A1 | 6/2009 | Arai | |
| 2009/0169693 A1 | 7/2009 | Hoffman | |
| 2011/0108752 A1 | 5/2011 | Morin | |
| 2011/0284536 A1 | 11/2011 | Walters | |
| 2012/0058226 A1 | 3/2012 | Winkler et al. | |
| 2012/0243807 A1 | 9/2012 | Pascoe | |
| 2012/0247346 A1 | 10/2012 | Hoffman et al. | |
| 2012/0281933 A1 | 11/2012 | Beer | |
| 2013/0045308 A1 | 2/2013 | Gorbatenko | |
| 2013/0048125 A1* | 2/2013 | Hoffman | B65D 77/225 137/852 |
| 2013/0156897 A1 | 6/2013 | Goldstein | |
| 2013/0266699 A1 | 10/2013 | Middis et al. | |

(56) References Cited

U.S. PATENT DOCUMENTS

| | | |
|---|---|---|
| 2014/0275932 A1 | 9/2014 | Zadig |
| 2014/0318653 A1 | 10/2014 | Hoffman et al. |
| 2015/0102030 A1* | 4/2015 | Gardner ............... B65D 25/00 220/62.11 |
| 2015/0135967 A1 | 5/2015 | Hoffman et al. |
| 2016/0340085 A1* | 11/2016 | Pettis ..................... B32B 27/36 |
| 2017/0001783 A1 | 1/2017 | Binda |
| 2017/0283136 A1 | 10/2017 | Branyon |
| 2017/0341356 A9 | 11/2017 | Morin |

FOREIGN PATENT DOCUMENTS

| | | |
|---|---|---|
| DE | 3312887 A1 | 10/1984 |
| EP | 00024310 | 7/1980 |
| EP | 174188 A1 | 3/1986 |
| EP | 1188683 A2 | 3/2002 |
| EP | 1481911 | 1/2004 |
| EP | 1538107 | 8/2005 |
| EP | 2719637 A1 | 4/2014 |
| JP | 2014076858 | 5/2014 |
| WO | 83/04081 | 11/1983 |
| WO | 2007113097 A1 | 10/2007 |
| WO | 09/142987 | 11/2009 |
| WO | 10/020453 | 2/2010 |
| WO | 2011056709 A1 | 5/2011 |
| WO | 11/091924 | 8/2011 |

OTHER PUBLICATIONS

Robert Bosch GmbH. "CVA 2000/3000 V45 Valve Applicators for the "aromafin" V45 Exterior Aroma Protection Valves." 4 pages. Date: Undated.

Robert Bosch GmbH. "Bosch aroma protection valves." 16 pages. Date: Undated.

Plitek Asia Limited. "Pli-Valv Product Selection Guide." 1 page. Date: Apr. 2005.

Plitek, LLC. "PV-15 One-Way Degassing Valve Product Specification." 1 page. Date: Oct. 2007.

Plitek, LLC. "PV-28 One-Way Degassing Valve Product Specification." 1 page. Date: Oct. 2007.

Plitek, LLC. "PV-41 One-Way Degassing Valve Product Specification." 1 page. Date: Oct. 2007.

Plitek, LLC. "PVA-120 Valve Applicator Product Specification." 1 page. Date: Oct. 2007.

Plitek, LLC. "Pli-Valv Package Degassing System PV-28." <www.plitek.com/products/pv28.asp> 1 page. Date: Jan. 30, 2008.

Plitek, LLC. "Pli-Valv Package Degassing System PV-41." <www.plitek.com/products/pv41.asp> 1 page. Date: Jan. 30, 2008.

Avery Dennison. "Degassing Valve helps protect coffee freshness." 3 pages. Date: Jul. 2012.

PCT International Application No. PCT/US2020/21093. International Search Report and Written Opinion, dated Jun. 16, 2020 (6 pages).

* cited by examiner

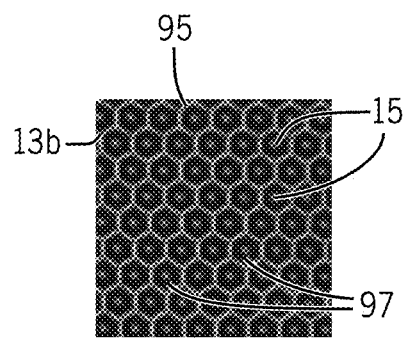
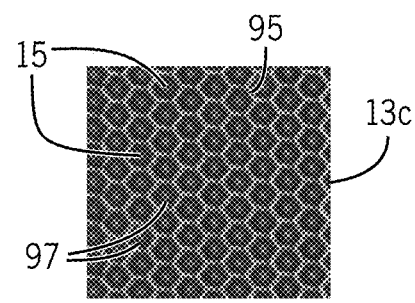
FIG. 12A        FIG. 12B
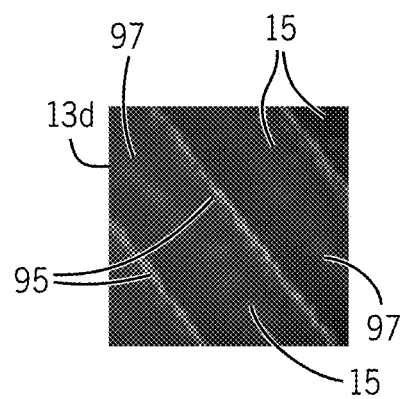
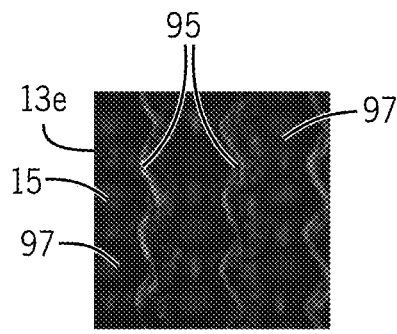
FIG. 12C        FIG. 12D

PRESSURE RELIEF VALVE WITH WETTING FLUID RESERVOIRS

FIELD

This invention relates generally to one way pressure relief valves with pre-applied wetting fluid of the type that may be applied to packaging for products, such as dry coffee product packaging, and more particularly, to pressure relief valves with structure for retaining the wetting fluid within the valve.

BACKGROUND

Dry roasted coffee is most flavorful when packaged immediately following the production process. It is desirable to package the coffee immediately after roasting and processing because contact between the coffee and ambient air can oxidize the coffee, causing a degradation in coffee flavor.

An obstacle to immediate packaging of the coffee is the well-known fact that roasted coffee produces large volumetric amounts of gas, including carbon dioxide gas. If the coffee is packaged in a flexible package, such as a pillow bag, the gas will cause the package to expand and to distort, potentially resulting in failure of the package or making the package appear swollen and unattractive to a consumer. The rate of gas production by the coffee can be decreased by degassing the coffee before packaging. Degassing involves holding the freshly roasted coffee in large bins for up to 72 hours. During this degassing period, the freshly roasted coffee can absorb ambient oxygen causing the aforementioned degradation and loss of flavor to occur. Degassing the coffee extends the time before the coffee can be packaged making the packaging process less efficient and more costly. Adding to the cost is that a large investment must be made in the physical plant and in the degassing tables and other equipment needed to process the coffee.

A solution to the aforementioned problems is to package the coffee immediately after roasting and processing in a package including a one-way pressure relief. A pressure relief valve provides an opportunity to release gas from the package while protecting the coffee from any contact with ambient air and the resultant oxidation. More specifically, the pressure relief valve is attached to, or is a part of, the coffee package. The pressure relief valve allows high-pressure gas out of the package while preventing ambient air from entering the package and coming into contact with the coffee.

It is important that the pressure relief valve provide an air-tight seal when pressure within the package is below that required to open the valve. Such air-tight seal is necessary to prevent the ambient air from entering the package. The air-tight seal must reform after each opening and closing of the valve and that seal must form responsive to delicate (i.e., quite small) opening and closing movements of the valve components.

Certain pressure relief valves utilize a component referred to in the valve industry as a "dry strap" or simply as a "strap" in combination with a fluid which wets a surface of the dry strap to control the one-way flow of gas through the valve. Such a dry strap is typically a strip-like layer or membrane which overlies a vent provided in a base or other part of the valve. The dry strap provides a closure around and over the vent which permits gas outflow while blocking ambient air inflow.

The wetting fluid, such as a silicone oil, a graphite impregnated oil, a food grade oil, or a food grade silicone grease is typically added between the dry strap and base and around the vent to wet the facing surfaces of the dry strap and base. The surface tension provided by the wetting fluid enables the dry strap to provide a complete closure of the dry strap against the base or other element of the valve, sealing the vent. The wetting fluid may be applied just before the valve is applied to the package or at the time of valve manufacture.

One-way pressure relief valves including a wetting fluid have performance benefits making them excellent for their intended purpose. The wetting fluid provides for an excellent air-tight seal of the valve. The wetting fluid allows the valve to open and close notwithstanding the very delicate opening and closing movements of the dry strap of the valve. And, valves including a wetting fluid can be engineered to open and close at predictable, low pressures.

However, the use of a wetting fluid introduces potential complexities with respect to use of the valve. Liquid-type wetting fluids typically used in pressure relief valves have flow properties. Consequently, it is possible that the wetting fluid can migrate or "leak" out of the valve. Typically, an amount of wetting fluid in excess of the amount needed to adequately wet the valve is utilized in anticipation that some of the wetting fluid will inevitably migrate out of the valve.

It is desirable that migration of wetting fluid from the valve be minimized or avoided. Contact between any wetting fluid and the exterior surfaces of the valve or the exterior surfaces of the package to which the valve is attached can make the valve and package feel greasy potentially diminishing the appearance of the product to a consumer.

Wetting fluid which migrates out from within the valve can also come into contact with adhesive on the outer side of the valve provided to temporarily secure the valve to a release liner or to permanently secure the valve to a package. Contact between the wetting fluid and adhesive can lessen the effectiveness of the adhesive. This is referred to as "killing" the tack provided by the adhesive. If the adhesive fully or partially fails, then the valve may become fully or partially detached from the release liner on which the valve is supplied potentially resulting in incorrect application of the valve to the package. Obviously, any valves which become contaminated by contact between the wetting fluid and adhesive may have to be discarded. And, any adhesive failure can result in the valve becoming detached from the package after application thereto, potentially allowing for spoilage of the coffee or other product due to contact with ambient air.

As can be appreciated, the foregoing problems can be exacerbated if excess amounts of wetting fluid are utilized to compensate for anticipated leakage. For these and other reasons it is desirable to use only the minimum amount of wetting fluid necessary to adequately wet the valve surfaces.

It would be an improvement in the art to provide a one-way pressure relief valve which enjoys the performance benefits provided by use of a wetting fluid yet avoids the potentially detrimental effects caused by "leaking" of the wetting fluid onto exterior surfaces of the valve, which enables the exterior surfaces of the valve to appear to be an indistinguishable part of the package, and which enables the valve to remain securely on the release liner before application to the package and to remain affixed to the package once applied thereto, all thereby contributing to a perceived improvement in the quality of the packaged goods.

SUMMARY

The present invention relates to improved one-way pressure relief valves with wetting fluid reservoirs. The valves may be used to eliminate gas from a package while blocking ambient air from entering the package potentially damaging the goods within the package. The valves utilize a wetting fluid to improve closure of the valve. The wetting fluid reservoirs lessen or eliminate migration (i.e., "leaking") of the wetting fluid from the valve by providing storage locations for the wetting fluid. Avoidance of migration of wetting fluid out of the valve provides an opportunity for performance benefits. Benefits may include predictable and accurate valve opening and closing, maintenance of the appearance of the valve and package, and maintenance of adhesion between the valve and the release liner or package to which the valve is attached.

In embodiments, a pressure relief valve with wetting fluid reservoirs according to the invention may include a base, a cover, and a dry strap between the base and cover. A base may have a first side, a second side, an area, a peripheral edge, and a vent formed by one or more apertures extending entirely through the base. The cover may overlie the base and may overlie the dry strap. The cover may have a first side, a second side, a cover area, a peripheral edge, and opposite end portions secured with respect to the base.

The dry strap overlies the entire vent with a second side of the dry strap facing the first side of the base and such facing side of the dry strap may at least partially abut the first side of the base. In certain non-limiting embodiments, the dry strap may optionally have a width in a first direction which is less than the widths of the base and cover.

The fluid reservoirs may be provided on all or a part of a textured surface or surfaces of the valve. In certain embodiments, the textured surface may be on the second side of the dry strap facing the base, or on the first side of the base facing the dry strap, or on the both the first side of the base and the second side of the dry strap. Each textured surface may define the fluid-holding reservoirs therein. The textured surface may include outer surface portions and inner surface portions and at least the inner surface portions define the reservoirs. The reservoirs provide microscopic volumetric spaces (i.e., small pockets or voids) which collect and hold the wetting fluid lessening or preventing the wetting fluid from migrating out of the valve. In certain preferred embodiments, the textured surface is located on just the second side of the dry strap facing the base. In such embodiments, a textured surface on the base first side becomes unnecessary.

Different types of textured surfaces may be implemented. For example, the outer surface portions and the inner surface portions of the textured surface may be irregular. By way of further example, the outer surface portions and the inner surface portions of the textured surface may be of a regular repeating pattern. Combinations of irregular and regular outer and inner and surfaces may be implemented.

In embodiments, the textured surface may have a matte-finish type appearance indicative of a microscopic rough or unsmooth surface or consistency defining the reservoirs. Such a matte-finish appearance may be created in a surface of the dry strap and/or base by various means such as by chemical etching, plasma treating, and laser-ablading.

The wetting fluid may be disposed between the dry strap and the base entirely around the vent and within a plurality of the reservoirs. The wetting fluid helps to form an air tight seal between the dry strap and base closing the vent when the valve is in its closed state.

In another aspect of the invention, an adhesive may be on the second side of the base to secure the valve to a surface such as a release liner or package. In use, the adhesive may attach the valve to the package with the vent in the base over, surrounding, and in alignment with a vent in the package.

The adhesive may be selected from the group consisting of pressure-sensitive adhesives (PSAs), heat-activated adhesives, ultra-violet cured adhesives, water-based adhesives, solvent-based adhesives, and rubber-based adhesives. In particular embodiments, the adhesive selected may be of an oleophobic type. Oleophobic adhesives are examples of types of adhesives with desirable resistance to loss of adhesion potentially caused by contact with the wetting fluid.

Wetting fluids which may be implemented to provide predictable and precise opening and closing of the valves may include silicone oil, graphite-impregnated oil, food grade oil, and food grade silicone grease. The volumetric amount of wetting fluid may be selected based on factors such as the size of the valve. In some embodiments, about 1.5 µL to about 2.3 µL of wetting fluid may be used. In still another aspect of the invention, the wetting fluid may have a viscosity engineered to minimize leaking. For instance, the viscosity and flow rate of the wetting fluid may be adjusted to minimize leakage. The wetting fluid may be engineered to have a viscosity of about 100 centipoise to about 350 centipoise so as to accomplish minimization of fluid migration.

The vent in the base may be a single opening or a plurality of openings. Plural openings may be defined by a plurality of aperture and barrier portions. In embodiments, the barrier portions defining the apertures may be spaced apart by about 0.020 inches or less. Such small apertures may obstruct passage of small particles, such as coffee particles, from entering the valve and interfering with valve opening and closure. Such small apertures in combination with a wetting fluid of an appropriate viscosity, may also minimize migration of wetting fluid out of the valve through the apertures.

Other features and embodiments are described in the drawings and detailed description which follows.

BRIEF DESCRIPTION OF THE DRAWINGS

Examples of pressure relief valves having wetting fluid reservoirs may be understood by reference to the following description taken in conjunction with the accompanying drawings, in which like reference numerals identify like elements throughout the different views. For convenience and brevity, like reference numbers are used for like parts amongst the embodiments. The drawings are not necessarily to scale, emphasis instead being placed upon illustrating the principles of the invention. In the accompanying drawings:

FIGS. 12A-12D illustrate further embodiments of textured surfaces with wetting fluid reservoirs.

DETAILED DESCRIPTION

Figure 1:
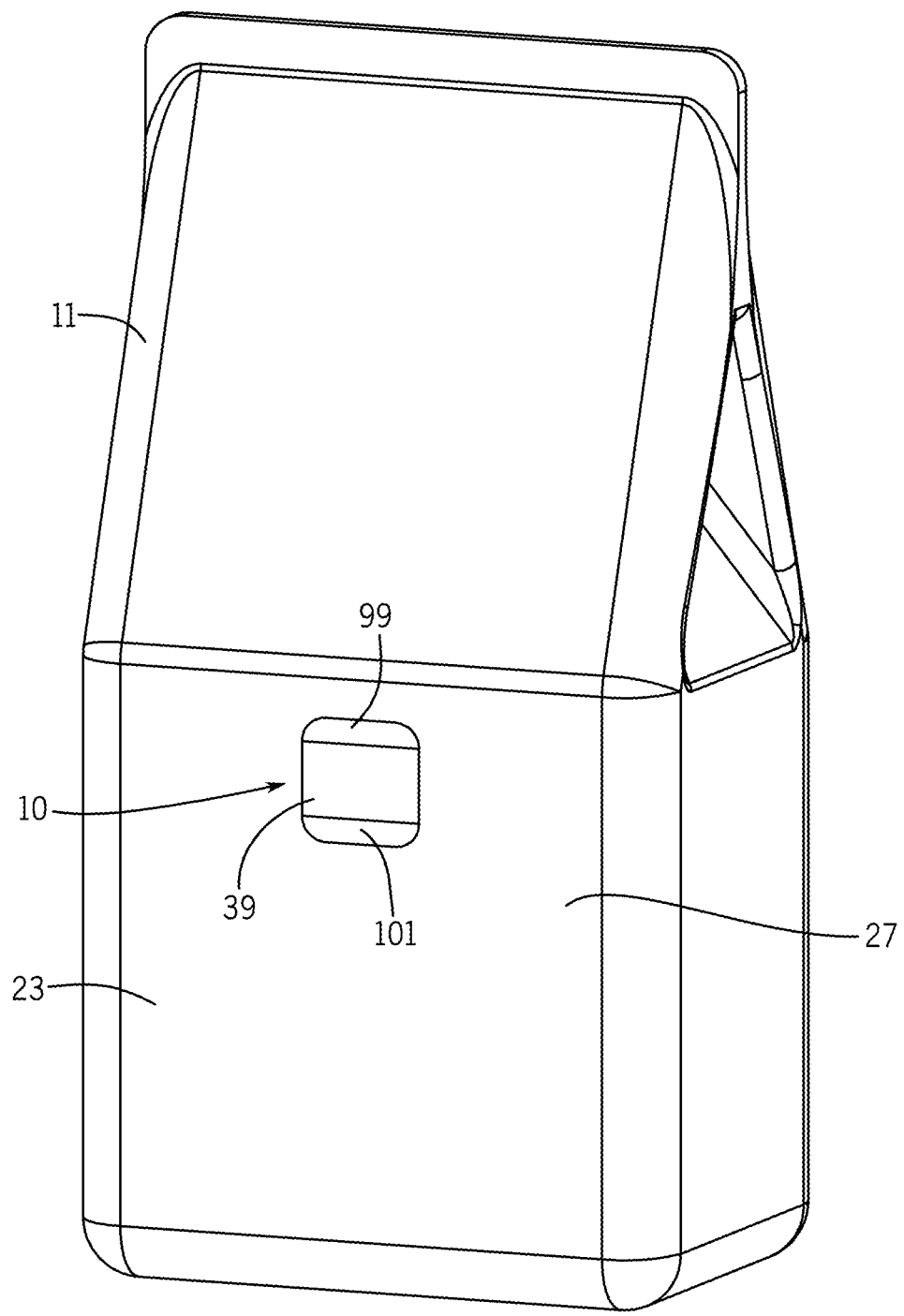
FIG. 1 is a representative coffee-containing package including an embodiment of a pressure relief valve having wetting fluid reservoirs according to the invention.

As illustrated in FIGS. 1-7 and 9-13, the present invention relates to improved one way pressure relief valves, embodiments of which are indicated by reference numbers 10 and 10a. Valves 10, 10a of the types described herein may be for releasing gas from a product package 11 such as the bag-type package 11 illustrated in FIG. 1. Certain components of exemplary valves 10, 10a may be alike and, for convenience and brevity, such components are discussed concurrently and have like reference numbers. A feature of valve 10 is that it is provided with a textured surface 13 including a plurality of wetting fluid reservoirs 15 (also referred to simply as reservoirs 15) for holding a wetting fluid 17. In the further example of valve 10a illustrated in FIG. 11, plural textured surfaces 13, 13a are provided and each has wetting fluid reservoirs 15. In the examples and as will be described herein, many reservoirs may be provided and, for convenience and brevity, reference number 15 is used to indicate representative ones of the reservoirs 15.

Retention of wetting fluid 17 within reservoirs 15 represents an improvement in the field of pressure relief valves. Retention of wetting fluid 17 within valve 10, 10a limits or eliminates migration or "leakage" of wetting fluid 17 out from valve 10, 10a where the wetting fluid 17 can disadvantageously impart a greasy feeling to the outside of the valve 10, 10a or the outside of package 11. Therefore, valve 10, 10a provides an opportunity to maintain the attractive feel and appearance of the valve 10, 10a and package 11. Retention of wetting fluid 17 can also avoid lessening of adhesion of the valve 10, 10a as can occur if wetting fluid comes into contact with the adhesive used to hold valve 10, 10a to a release liner 19 (FIG. 13) or to package 11 (FIG. 1). Other valve 10, 10a structure and improvements may be provided to further facilitate retention of wetting fluid 17 within valve 10, 10a as described herein.

Package Examples

Referring then to FIG. 1, the package 11 example illustrated therein may be of a type used to hold consumable goods such as dry ground roasted coffee 21. Packages 11 of this type may have a flexible or collapsible wall or walls 23 and are sometimes referred to as a "pillow bag." These types of packages 11 are closed or sealed once filled with coffee 21 or another material. Such packages may be re-closed once coffee 21 or other material is removed therefrom. Gas produced internal to package 11 by gas-producing material, such as ground roasted coffee, can cause the package 11 wall or walls 23 to expand and take on a swollen appearance which may be unattractive to consumers. The expanded volumetric size of a swollen package 11 may make it problematic to hold multiple packages 11 in a single box, or to store packages 11 on a grocery store or household shelf.

Figure 4:
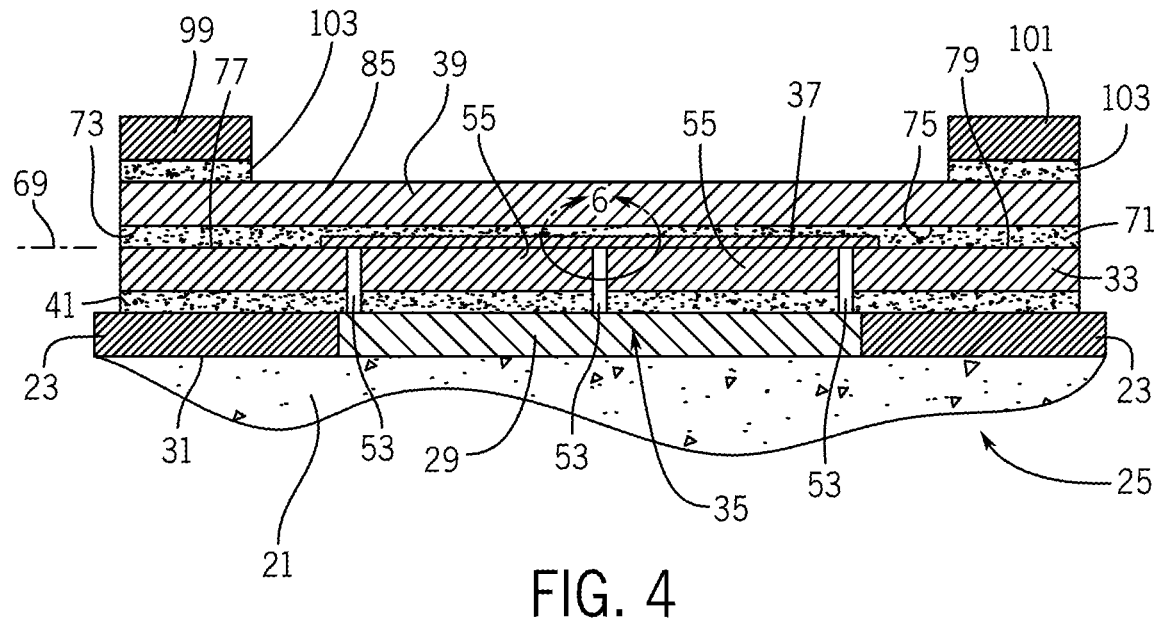
FIG. 4 is a section view taken along section 4-4 of FIG. 2 showing the pressure relief valve in a closed position.
Figure 5:
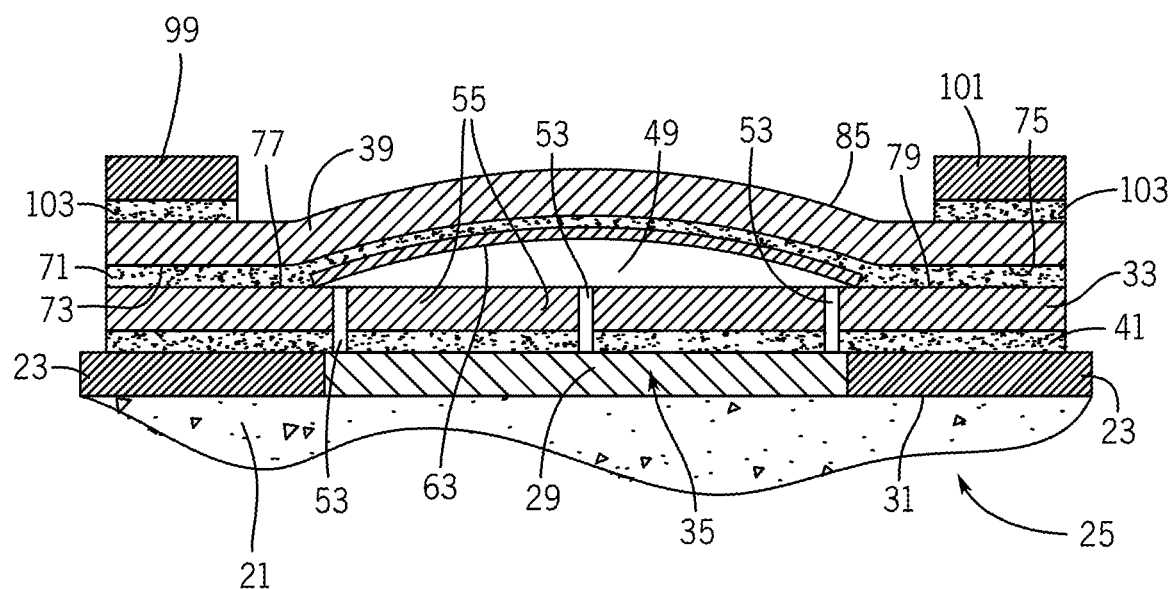
FIG. 5 is a section view taken along section 4-4 of FIG. 2 showing the pressure relief valve in an exaggerated open position.

Referring next to FIGS. 1 and 4-5, gas to be released from package 11 is within an interior portion 25 of package 11 bounded by walls 23. It should be noted that the gas to be released from package 11 could be from a source other than a gas-producing material within package 11. For example, gas within the interior portion 25 of package 11 could be entrapped air remaining in the package 11 following the packaging process. Gas could be entrapped within a head space of package 11 during packaging of any bulk material (e.g., granular animal food). Such entrapped gas could expand the volumetric size of the package 11 making the package 11 less compact and requiring more space for storage of the package 11 or making it difficult to stack the packages for palletized shipment. In such a setting, a pressure relief valve 10, 10a could be used to allow the package 11 to be compressed to evacuate gas through the valve 10, 10a, thereby reducing the volumetric size of package 11.

Accordingly, pressure relief valve 10, 10a may be used with any type of package wherein it is desired to release gas therefrom and the bag-type package 11 illustrated in FIG. 1 is merely one example of a package 11 which may be used with pressure relief valve 10, 10a. Representative examples of other types of packages which may be used with pressure relief valve 10, 10a include flexible and rigid cans, packs, bags, and pouches.

Pressure relief valve 10, 10a is preferably affixed to an exterior surface 27 of package 11 over a vent opening 29 provided entirely through package 11 wall 23. Vent opening 29 in package 11 may be a hole or holes in wall 23. Pressure relief valve 10, 10a may be affixed to any suitable exterior surface 27 of package 11 having a vent opening 29. In suitable packages, the vent may be located in, for example, a top, a bottom, a front, a rear, a side, a lid, a cover, or a cap of the package. Pressure relief valve 10, 10a may also be used on an interior surface 31 of package 11 in appropriate circumstances.

Valve Component Examples

Figure 9:
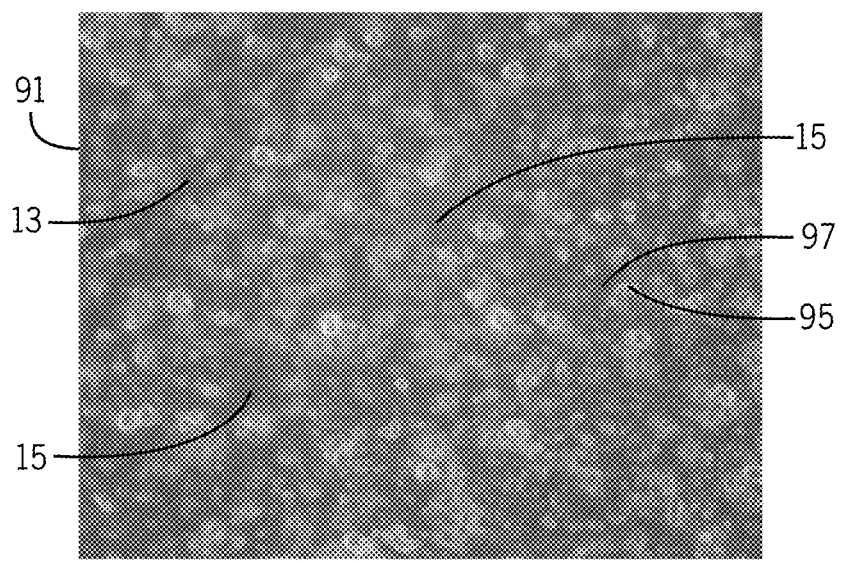
FIG. 9 is a micro-graph of a textured valve surface according to the invention, such as may be on a dry strap or on a base, showing wetting fluid reservoirs.
Figure 10:
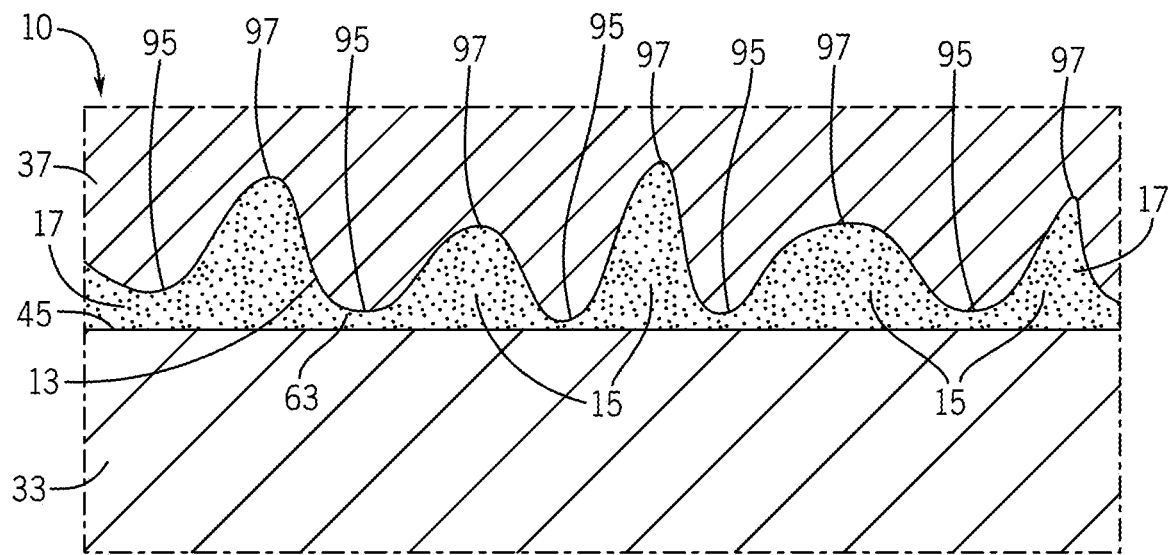
FIG. 10 is a greatly enlarged schematic section view taken along a portion of detail section 6-6 of FIG. 4 showing a dry strap including a textured surface with wetting fluid reservoirs.
Figure 11:
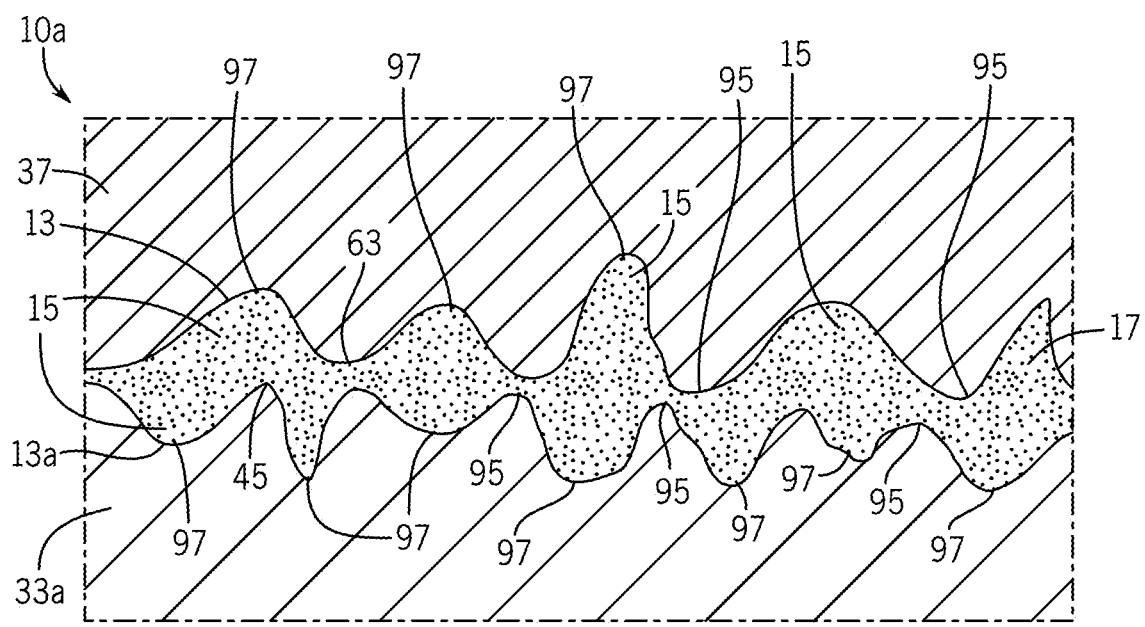
FIG. 11 is a greatly enlarged schematic section view like that shown in detail section 6-6 of FIG. 4 but illustrating a further embodiment in which both the dry strap and base include a textured surface with wetting fluid reservoirs.

Referring now to FIGS. 1-7 and 9-11, components of embodiments of pressure relief valves 10, 10a will be described. In the examples, valve 10, 10a components may include a base 33 with a vent 35, a dry strap 37 abutting the base 33 and covering (e.g., overlying) the vent 35, a wetting fluid 17 between the base 33 and dry strap 37, and a cover 39. Textured surface 13 including wetting fluid reservoirs 15 may be on dry strap 37, on base 33, or on both dry strap 37 and base 33. Valve 10a illustrated in FIG. 11 represents an example of a valve with textured surfaces 13, 13a on both dry strap 37 and base 33a. Reservoirs 15 contribute to retention of wetting fluid 17 within valve 10 and valve 10a, minimizing or avoiding migration (i.e., "leaking") of wetting fluid 17 out of valve 10, 10a. Valve 10, 10a may include other structure as described herein.

Base Examples

Referring then to FIGS. 3-7 and 10, valve 10 may include a gas-impervious base 33 which may also be thought of as an outer layer in the examples. Base 33 should be of a gas-impervious material to block passage of any ambient air through base 33 and into package 11. FIG. 11 illustrates another base 33a iteration used in connection with valve embodiment 10a. For simplicity and convenience, like reference numbers are used to indicate like parts of each base 33, 33a. Each base 33, 33a provides a type of platform on which pressure relief valve 10 may be constructed and which may be attached directly to package 11, for example by means of adhesive 41 as described below. The term "base" as used herein is intended to have a broad meaning and may include, for example, a base of a single layer of material such as base 33, 33a, a laminate of multiple joined-together layers, one or more layers with a filter element, or other supportive structure for valve 10, 10a.

In the examples, base 33, 33a may include a peripheral edge 43, a first side 45, and a second side 47. Relative to the parts comprising pressure relief valve 10, first side 45 can be considered an inner side while second side 47 can be considered an outer side. Exemplary base 33 (FIGS. 3-7 and 10) may be identical to base 33a (FIG. 11) with the exception that first side 45 of base 33 lacks a textured surface 13 whereas base 33a includes a textured surface 13.

Figure 7:
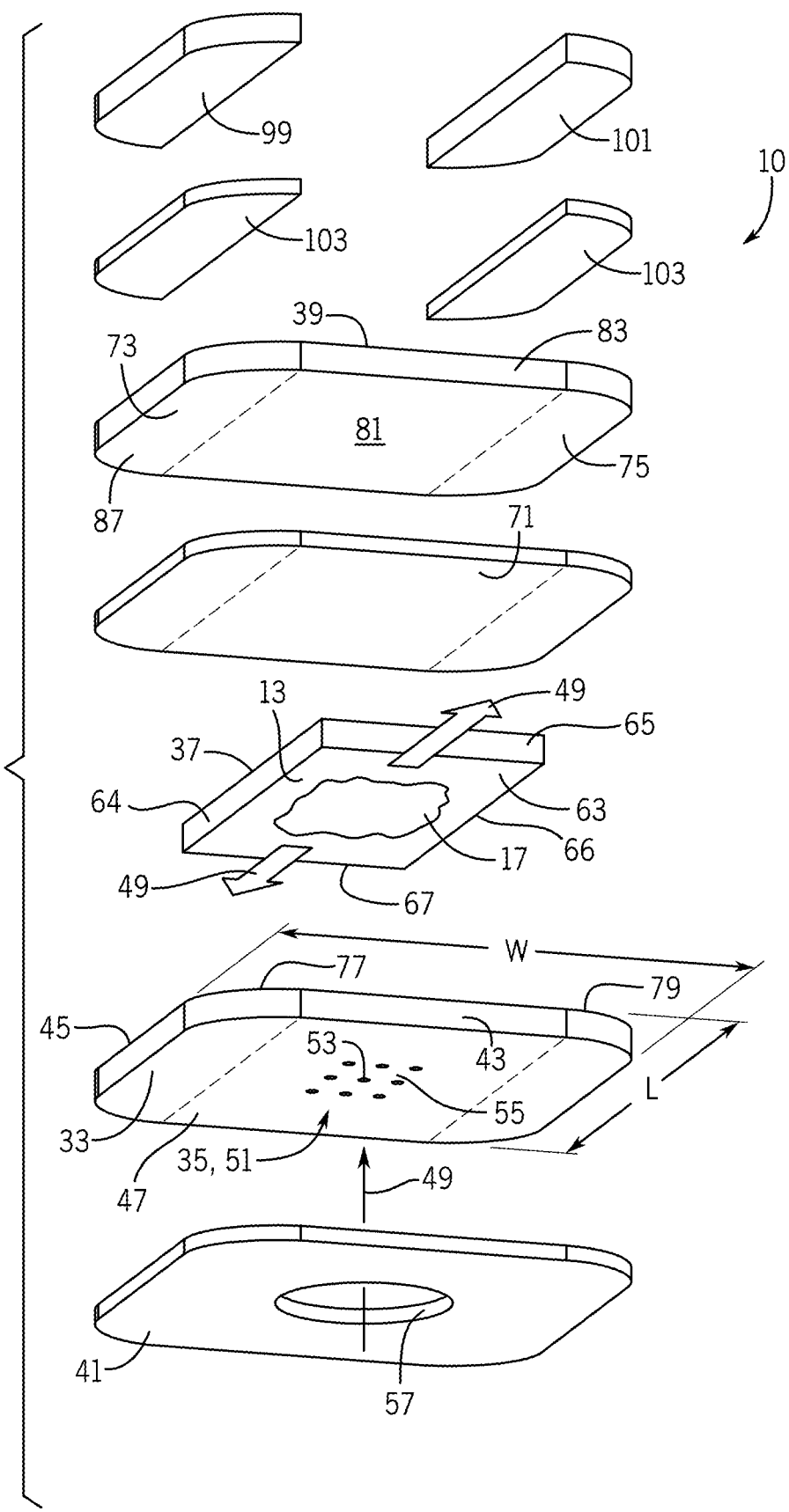
FIG. 7 is an exploded perspective view of the pressure relief valve of FIG. 1.

In the examples, base 33, 33a is generally flat, or planar, and may be made of a strip-type material. Referring to FIG. 7, base 33, 33a may have a width dimension identified by the character "W" and a length dimension identified by the character "L". Representative materials suitable for use as base 33, 33a material can include polyethylene, polypropylene, and polyester. An example of a suitable polyester is polyethylene terephthalate ("PET"). The aforementioned materials are not exclusive as other suitable materials may be implemented as base 33, 33a. Base 33, 33a may have a thickness dimension between first and second sides 45, 47 in the range of about 0.00025 inches to about 0.050 inches for various iterations of valve 10. As used herein, "about" means or refers to the value given ±10%.

As illustrated in the examples of FIGS. 1-7, 10, and 13, base 33 may include a vent 35. Base 33a illustrated in FIG. 11 may include a vent 35 identical to that described in connection with valve 10 of FIGS. 1-7, 10 and it is to be understood that the description of vent 35 is applicable to valve 10a and base 33a. Vent 35 may be generally centrally disposed within peripheral edge 43 of base 33, 33a and may extend entirely through base 33, 33a, thereby allowing gas to pass through vent 35 and entirely through base 33, 33a. In the examples, valve 10, 10a would preferably be affixed to an exterior surface 27 of package 11 with vent 35 of base 33, 33a over and in alignment with vent opening 29 in package 11. According to these examples, vent 35 provides part of a passageway 49 for gas within package 11 to be directed through base 33, 33a and into and through valve 10, 10a.

Referring next to FIGS. 2-7, vent 35 shown with base 33 (and useful in base 33a) may function as a filter element 51. A vent 35 in the form of a filter element 51 can block particulates (e.g., coffee 21) from entering valve 10 and potentially interfering with complete closure and operation of valve 10. Incomplete closure of valve 10 can allow ambient air to enter package 11 through valve 10, potentially oxidizing and damaging coffee 21 or other material contained within package 11.

Referring again to FIGS. 2-7, exemplary vent 35 is defined by aperture 53 and barrier 55 portions. In the examples, barrier portions 55 are all parts of base 33 (and base 33a) which are not aperture portions 53. Barrier portions 55 may be continuous, gas-impermeable portions of base 33, 33a which serve as a barrier to movement of any particulate substance (e.g., coffee 21) through base 33, 33a.

Referring again to FIGS. 2-7, aperture portions 53 preferably consist of plural small openings in base 33, 33a. To avoid obscuring the drawings, just several of such small apertures are indicated by reference number 53. In the examples of valve 10, nine apertures 53 are illustrated. The nine apertures 53 are shown in three evenly-spaced rows and columns. Aperture portions 53 may be sized to block particles typical of those found in ground coffee 21 which may be about 300 μm or less in size. In other words, in certain embodiments barrier portions 55 defining apertures 53 therebetween may be spaced apart by about 0.020 inches or less and apertures 53 of such type may be thought of as microapertures. Aperture portions 53 may be formed by any appropriate means, such as by laser drilling or punching.

It is to be understood that any suitable number, size, spacing, and arrangement of apertures may be utilized and the examples including nine apertures 53 are merely illustrative. For example, a single aperture could be provided. Spacing between plural apertures 53 could be more or less than 0.020 inches to provide apertures of any desired area. Circles, chevrons, x-shaped apertures, and combinations of shapes and sizes of apertures 53 may be implemented. Even spacing is optional as apertures 53 may be randomly distributed across base 33, 33a.

In a further embodiment, a base (e.g., base 33 or 33a) could include a vent comprising a liquid-impervious membrane (not shown). Such a vent embodiment could be impervious to liquid while allowing passage of gas therethrough. Material used to construct such a vent could include flashspun high-density polyethylene fibers sold under the brand name TYVEK. Such liquid-impervious membrane may, for example, be located within an opening through base 33 or along a first 45 or second side 47 of base 33 forming a part of base 33. Addition of a separate adhesive may be implemented as appropriate to adhere such membrane to valve 10 and to secure valve 10 to a release liner, such as release liner 19.

A further benefit of a vent 35 comprising very small apertures 53 (e.g., micro-apertures less than about 0.020 inches across) defined by barrier portions 55 or with a vent of flashspun high-density polyethylene fibers is that such a vent 35 may limit and restrict any migration of wetting fluid 17 through apertures 53. In other words, small openings (e.g., apertures 53) can contribute to avoidance of "leakage" of wetting fluid 17 from valve 10.

Adhesive Examples

Referring now to FIGS. 4-5 and 7, adhesive 41 may be provided on base 33, 33a second side 47 (i.e., an outer side) to both removably mount base 33, 33a and valve 10, 10a on release liner 19 (FIG. 13) and to permanently attach base 33, 33a and pressure relief valve 10, 10a to a package 11 (FIG. 1).

Referring once again to FIGS. 4-5 and 7, adhesive 41 may be deposited across base 33, 33a second side 47. As best shown in FIG. 7, adhesive 41 may be spaced from apertures 53 with a circular inner edge 57 surrounding apertures 53 and vent 35. Edge 57 and adhesive 41 block any lateral gas or air movement between valve 10, 10a and package 11. Adhesive 41 may be about 0.00025 inches to about 0.015 inches in thickness. By way of example, types of adhesives which may be utilized include pressure-sensitive adhesives (PSAs), heat-activated adhesives, ultra-violet cured adhesives, water-based adhesives, solvent-based adhesives, and rubber-based adhesives.

Oleophobic Adhesives

In embodiments, selection of an adhesive 41 which is resistant to degradation and loss of tack (i.e., tack killing) resulting from contact with wetting fluid 17 is desirable and can improve adhesion of valve 10, 10a to a surface such as release liner 19 and/or a wall 23 of package 11. Oleophobic adhesives are examples of adhesives 41 that have oil-resistant characteristics and which have excellent tack properties notwithstanding contact with oil-based fluids such as silicone oil, graphite impregnated oil, food grade oil, and food grade silicone grease commonly used as wetting fluids 17. Acrylic adhesives 41 are particularly preferred because they can be selected and/or formulated to have the desired oleophobic properties. Therefore, selection of an adhesive with oleophobic properties represents another aspect of the invention which, in combination with the reservoirs 15, can contribute to improved performance of valves 10, 10a.

Dry Strap Examples

Figure 2:
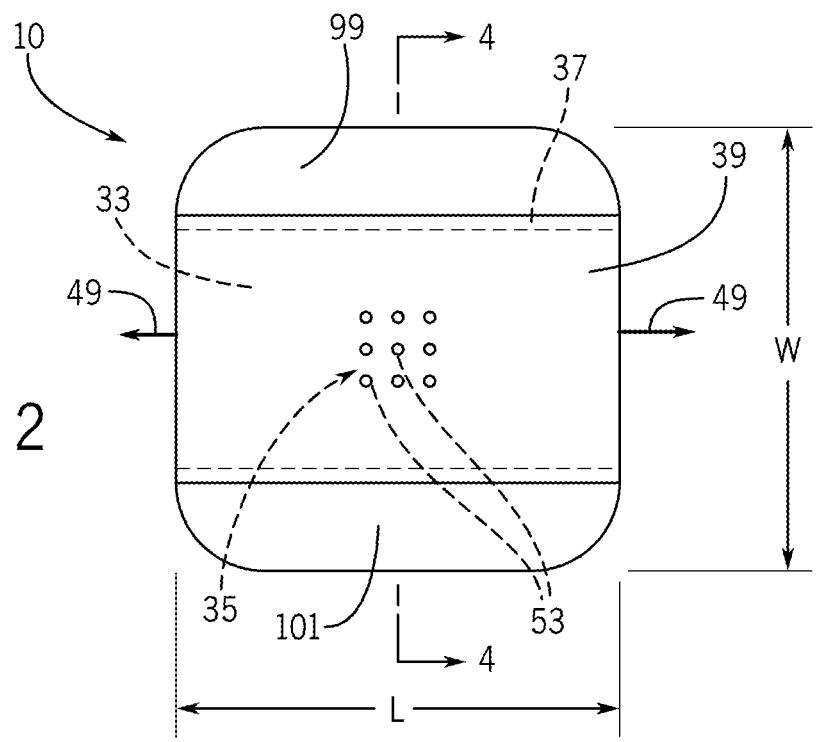
FIG. 2 is a plan view of the pressure relief valve of FIG. 1 in a closed position and showing certain internal components that would otherwise be hidden to thereby facilitate understanding.
Figure 3:
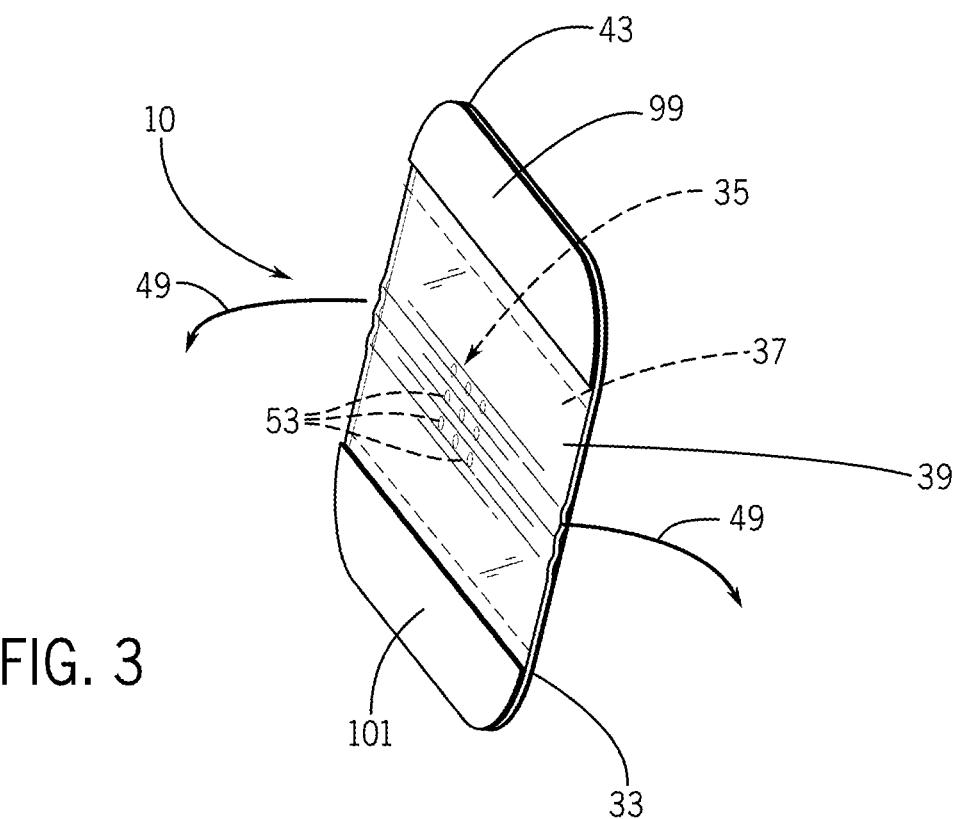
FIG. 3 is a perspective view of the pressure relief valve of FIG. 2 in an open position and showing certain internal components that would otherwise be hidden to thereby facilitate understanding.

Referring next to FIGS. 2-7 and 10-11, dry strap 37 enables pressure relief valve 10, 10a to be placed in a closed state and, alternatively, in an open state by allowing gas to flow through vent 35 along gas passageway 49 or by covering vent 35 blocking flow of ambient air or other gas therethrough. Referring to FIGS. 2, 4, 6, and 10-11, those figures illustrate valve 10, 10a in a closed state with dry strap 37 overlying vent 35. FIGS. 3 and 5 are examples of valve 10 in an exaggerated open state with dry strap 37 spaced apart from at least portions of base 33 and vent 35. In the closed state (FIGS. 2, 4, 6, and 10-11), dry strap 37 is in a first position blocking entry of ambient air into valve 10 and package 11. In the open state (FIGS. 3 and 5), dry strap 37 is in a further position, or positions, in which valve 10 permits one-way gas flow out from package 11, through pressure relief valve 10, along gas flow path 49 and out to the ambient air and surrounding environment. Dry strap 37 may, for example, function by undulating movement permitting separate gas bubbles to escape package 11 through valve 10. Surface tension provided by wetting fluid 17 holds dry strap 37 onto base 33, facilitating the air-tight seal blocking entry of ambient air through valve 10 and into package 11. It is to be understood that dry strap 37 of valve 10a has the same structure and operation as described in connection with valve 10.

Pressure relief valves 10, 10a may be engineered to predictably and accurately open and close based on a known, predetermined pressure differential between pressure inside package 11 and pressure outside package 11. The engineered pressure differential may be considered to be a target opening or closing pressure, meaning that the pressure differential need not be identical on every opening or closing cycle. Pressure relief valve 10, 10a may be designed to open with any desired pressure differential. By way of example only, pressure relief valve 10, 10a may be designed to have a targeted opening pressure when the pressure inside package 11 exceeds pressure external to package 11 by 0.4 psig (pounds per square inch gauge) or less. Pressure relief valve 10, 10a may be designed to close when the targeted pressure inside package 11 exceeds pressure outside package 11 by 0.008 psig or more. Other opening and closing pressures may be utilized and the foregoing are merely non-limiting examples. Opening and closing pressures can be adjusted, for example, by increasing or, alternatively, decreasing the area of aperture(s) 53 comprising vent 35 or by increasing or, alternatively, decreasing the viscosity of wetting fluid 17, or by selection of materials used for dry strap 37 and cover 39.

Examples of a dry strap 37 embodiment which may be used with valve 10, 10a will now be described in connection with FIGS. 4-7 and 10-11. In the examples, dry strap 37 overlies vent 35 between base 33, 33a and cover 39. Dry strap 37 may have a first, or outer side, side 61 facing toward cover 39 and a second, or inner, side 63 facing toward base 33, 33a first side 45.

Figure 6:
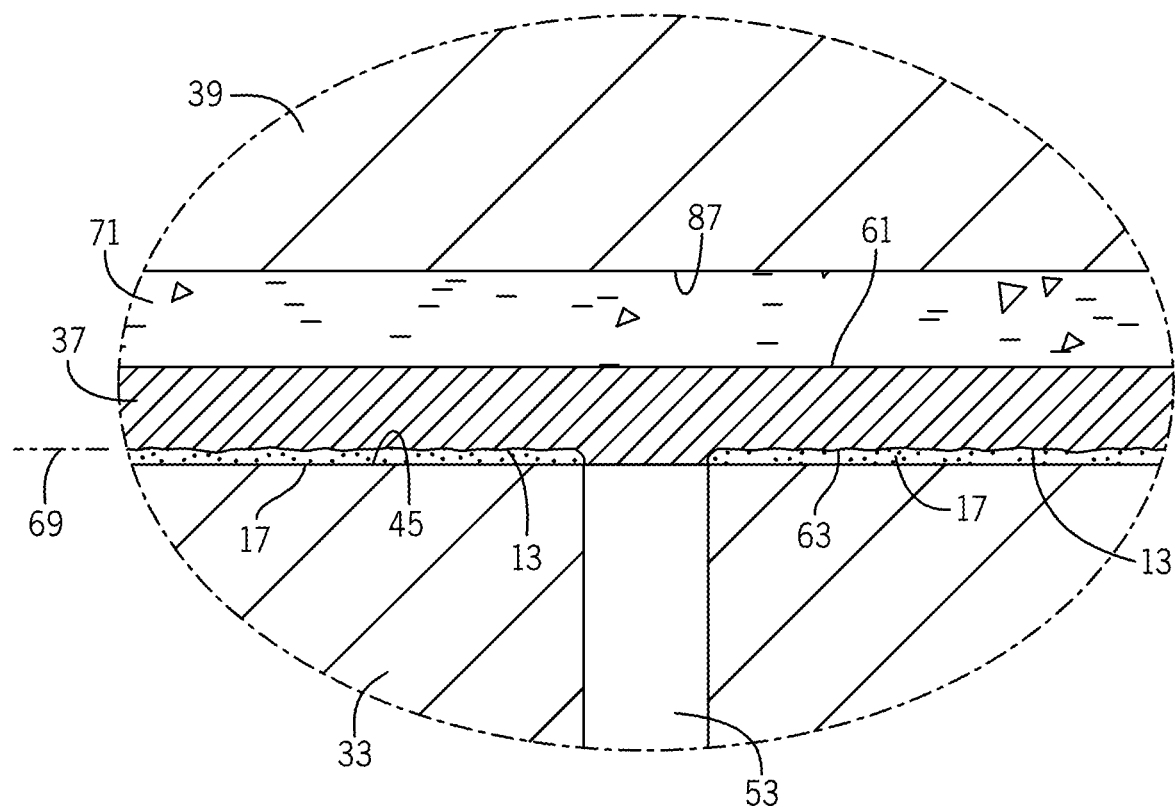
FIG. 6 is an enlarged section view taken along detail section 6-6 of FIG. 4.

Referring to FIGS. 2-5, 7, and 13, dry strap 37 may have a width dimension W between opposite sides 64, 66 of dry strap 37 which is less than the width dimension W of base 33, enabling cover 39 to be secured to base 33, 33a on opposite sides 64, 66 of dry strap 37 by adhesive 71 as described below. Dry strap 37 may have outer edges 65, 67 defining a length dimension L therebetween which is the same as the length L dimension of base 33, 33a (FIGS. 2-3 and 7). Preferably, each outer edge 65, 67 of dry strap 37 extends all the way to meet peripheral edge 43 of base 33, 33a. As illustrated in FIGS. 4 and 6, second side 63 of dry strap 37 may define and lie in a plane 69 when valve 10 is in the closed state or position.

In the examples, adhesive 71 may join dry strap 37 to cover 39 and may join cover 39 ends 73, 75 outboard of dry strap 37 sides 64, 66 to corresponding spaced apart attachment regions 77, 79 of base 33. Because cover 39 is unjoined to base 33 between cover 39 ends 73, 75 and attachment regions 77, 79, cover 39 is permitted to flex and to move at least partially away from base 33 first side 45 (FIGS. 3 and 5) along this unjoined cover 39 region 81 when valve 10 is in the open state to permit gas flow out of valve 10 and along gas flow path 49. Such flexing may be a slight undulating, or "burping", movement of dry strap 37 with portions of second side 63 of dry strap 37 spaced from plane 69 sufficiently to accommodate passage of gas bubbles between base 33, 33a and dry strap 37.

Referring to FIGS. 3, 5, and 7, gas flow path 49 represented by the arrows 49 may extend through vent 35 under dry strap 37 and may be bounded laterally by ends 73, 75 of cover 39. Gas flow path 49 channels and directs gas outflow through valve 10.

Dry strap 37 may have other shapes and configurations. For example, dry strap 37 may have a width dimension between sides 64, 66 and a length dimension between edges 65, 67 which are identical to the length dimension and width dimension of base 33, 33a and cover 39 with each outer side 64, 66 and edge 65, 67 of dry strap 37 extending all the way to meet the peripheral edge 43 of base 33, 33a and the peripheral edge 83 of cover 39 so that each of base 33, 33a, dry strap 37 and cover 39 have the same area. In such examples, base 33, 33a, dry strap 37, and cover 39 may be joined together by, for example, sonic welding of cover 39 ends 73, 75 to corresponding spaced apart attachment regions 77, 79 of base 33, 33a.

Further, base 33, 33a, dry strap 37, and cover 39 may have shapes other than the rectangular shapes illustrated. By way of example only, base 33, 33a, dry strap 37, and cover 39 may have circular shapes, or hexagonal shapes, or polygonal shapes.

As illustrated in FIGS. 4-7, dry strap 37 may be a single piece of material. By way of further non-limiting example, dry strap 37 may be a plural-part dry strap, for example, as described in commonly-owned U.S. Pat. No. 10,358,275.

Referring to FIGS. 2-7, dry strap 37 may be of a strip-type material. Dry strap 37 most preferably is of a gas-impervious material to avoid passage of ambient air through dry strap 37 and into package 11. Dry strap 37 may also be of a material which provides a vapor barrier preventing humidity in ambient air from entering package 11. Representative materials suitable for use as dry strap 37 material can include polyethylene, polypropylene, polyester such as PET, or other suitable material. As described below, dry strap 37 may be chemically etched or otherwise treated or processed to provide textured surface 13 on the second side 63 of dry strap 37 facing base 33, 33a. Dry strap 37 may have a thickness dimension between first side 61 (i.e., the outer side) and second side 63 (i.e., the inner side) in the range of about 0.00025 inches to about 0.005 inches for various iterations of valves 10.

Cover and Adhesive Examples

In the examples and referring to FIGS. 1-7 and 13, valve 10 cover 39 overlies base 33, 33a, 33b and dry strap 37. Cover 39 may be attached to dry strap 37 and base 33, 33a for example, by means of adhesive 71. In the examples, cover 39 includes peripheral edge 83, a first side 85 and a second side 87. Relative to base 33, 33a and dry strap 37, first side 85 may be considered an outer side, while second side 87 of cover 39 facing toward dry strap 37 and base 33, 33a can be considered an inner side.

In the examples, cover 39 may be made of a strip-type material. While a cover 39 of a single layer of material is shown, other arrangements are possible such as implementation of cover 39 as a plural-layer laminate.

Cover 39 may have a width dimension W and length dimension L (FIGS. 2, 7, 13) which approximate the width and length dimensions of base 33, 33a. Cover 39 peripheral edge 83 may be coextensive with base 33, 33a peripheral edge 43 as illustrated in FIGS. 1-5, 7, and 13. Dry strap 37 edges 65, 67 may extend to respective opposite edges of both cover 39 and base 33, 33a.

Cover 39 may have a thickness dimension between first and second sides 85, 87 in the range of about 0.00025 inches to about 0.05 inches for various iterations of valve 10. Cover 39 most preferably is of a gas-impervious material to prevent passage of any ambient air and moisture through cover 39 and into valve 10 and possibly into package 11. Representative materials suitable for use as cover 39 material can include polyethylene, polypropylene, polyester such as PET, or other suitable material.

Referring to FIGS. 4-7 and as previously described, ends 73, 75 of cover 39 on the second side 87 of cover 39 may be joined to attachment regions 77, 79 of base 33, 33a by adhesive layer 71 and may be unattached to base 33, 33a therebetween (i.e., unjoined region 81) allowing cover 39 to flex slightly away from base 33, 33a so that gas can flow out of valve 10 along gas flow path 49 as previously described. Adhesive 71 may be the same type of adhesive as used for adhesive layer 41 on base 33, 33a second side 47. Cover 39 may be joined to base 33, 33a attachment regions 77, 79 by means other than adhesive 71 such as the sonic welding previously described.

Wetting Fluid Examples

Referring to the examples of FIGS. 1-7, 10-11, and 13, valves 10, 10a of the type described herein are engineered for use with a wetting fluid 17 for the purpose of improving sealing closure of dry strap 37 against base 33, 33a to completely block ambient air entry into valve 10, 10a. In the examples of FIGS. 1-7 and 10-11 and 13, wetting fluid 17 wets first side 45 (i.e., the inner side) of base 33, 33a and second side 63 (i.e., the inner side) of dry strap 37 providing a surface tension which improves the aforementioned sealing closure of base 33, 33a and dry strap 37 around vent 35. Wetting fluid 17 may be deposited on first side 45 of base 33, 33a under dry strap 37 and completely around vent 35 and on barrier portions 55 between apertures 53. Wetting fluid 17 plates out onto at least first side (i.e., the inner side) 45 of base 33, 33a and second side 63 (i.e., the inner side) of dry strap 37 to wet and provide the surface tension between base 33, 33a and dry strap 37, improving the closure of valve 10, 10a. By way of non-limiting example, about 1.5 µL to about 2.3 µL of wetting fluid may be used for a valve having an area of about 25 mm².

As an example only, about 2 µL of wetting fluid 17 may be applied between dry strap 37 and base 33, 33a for a valve 10, 10a according to the invention having an area of about 25 mm². As described herein, the reservoir 15 structure of valve 10 provides space for wetting fluid 17 to reside within valve 10, 10a so that it does not migrate out from between dry strap 37 and base 33, 33a and onto release liner 19, package 11, adhesive 41 on second side 47 of base 33, 33a and onto exterior surfaces of valve 10.

As a result of the invention, opportunities exist to utilize relatively less wetting fluid 17 as compared with valves not including reservoirs 15. By way of example only, a valve 10, 10a with a base 33, 33a having an area of 25 mm² can utilize approximately 0.3 µL less wetting fluid 17 than a valve not including reservoirs 15. Any opportunity to utilize less wetting fluid 17 is desirable because there is less wetting fluid 17 to potentially migrate away from valve 10, 10a.

The wetting fluid 17 imparts excellent performance benefits to the valve 10, 10a, including providing an excellent air-tight seal of the valve 10, 10a while allowing very delicate (i.e., quite small) opening and closing movements of the valve 10, 10a, including undulating (i.e., burping) movement enabling gas bubble flow between base 33, 33a and dry strap 37. Valves 10, 10a including a wetting fluid 17 can be engineered to open and close at predictable, low pressures as described herein.

Examples of wetting fluid 17 may be silicone oil, a graphite impregnated oil, a food grade oil, food grade silicone grease, or other viscous fluid as previously described.

Wetting fluid 17 may be applied to valve 10, 10a at any suitable point including during valve 10, 10a manufacture or as the pre-manufactured valve is applied to the package (e.g., package 11). An advantage of valves 10, 10a is that the wetting fluid 17 may be precisely applied to the second side 63 of a running web of material used to provide dry strap 37 and/or the first side 45 of a running web of material used to provide base 33a during a running converting process in which the running webs are joined together to form valve 10, 10a. Precise placement of wetting fluid 17 onto reservoirs 15 where the wetting fluid 17 can be held as the webs forming the base 33, 33a, dry strap 37, and cover 39 are joined together during a running conversion process used to make valves 10, 10a is advantageous because it enables an accelerated manufacturing process while lessening any risk of wetting fluid 17 leaking from valve 10, 10a.

Reservoir Examples

Referring to FIGS. 6-7 and 9-11, valve 10, 10a may include one or more textured surface 13 with reservoir 15 structure provided to hold wetting fluid 17 to limit or avoid migration (i.e., "leaking") of wetting fluid 17 out and away from valve 10, 10a. As used herein, the term "textured" means or refers to a rough or uneven surface or consistency. Such roughness or unevenness providing the texture forming the reservoirs 15 may be on a microscopic level (i.e., very small). In certain examples, reservoirs 15 themselves are not visible to the naked eye but the textured surface 13 may provide a matte-finish in which light is scattered rather than reflected providing a relatively dull appearance to the naked eye. In the examples and as will be described herein, a textured surface 13 may include many reservoirs 15. As already stated, for brevity and convenience, reference number 15 is used to indicate representative ones of the reservoirs 15.

A textured surface 13 may be provided at various locations with respect to valve 10, 10a. As illustrated in the valve 10 embodiment of FIGS. 1-7 and 10, dry strap 37 second side 63 (i.e., the inner side) facing base 33, 33a first side (i.e., the inner side) 45 may include the textured surface 13. In such valve 10 and as illustrated in FIG. 10, base 33 may lack a textured surface 13. In other embodiments, textured surface 13 may be on the first side 45 (i.e., the inner side) of base 33 and not on dry strap 37 second side 63 facing base 33. In still other examples and as illustrated in FIG. 11, both dry strap 37 second side 63 and base 33a first side 45 (which faces dry strap 37) may include a textured surface 13. Such textured surface 13 may cover some, or all, of dry strap 37 second side 63 (i.e., the inner side) and/or base first side 45 (i.e., the inner side) as desired for wetting fluid 17 storage capacity.

Figure 8:
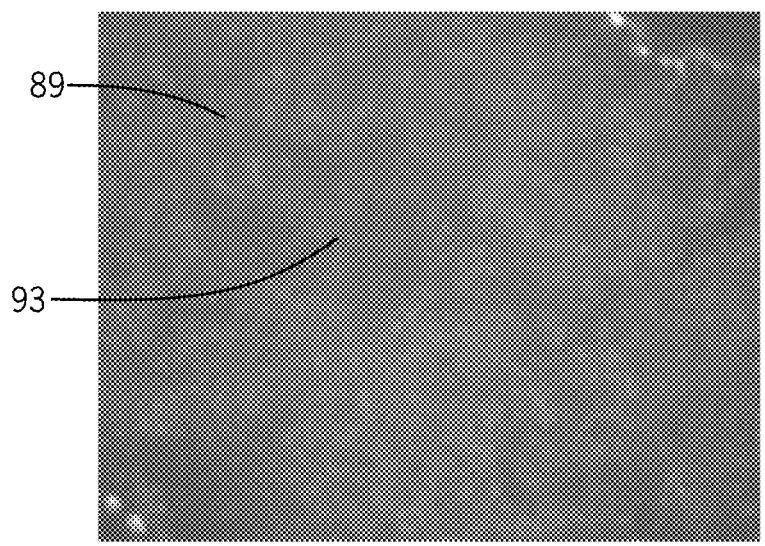
FIG. 8 is a micro-graph of a conventional valve surface, such as on a dry strap, showing a non-textured surface without wetting fluid reservoirs.

FIGS. 8-9 are micrographs provided as comparative examples of film strips 89, 91 with strip 89 having a non-textured surface 93 (FIG. 8) and strip 91 having a textured surface 13 (FIG. 9). FIGS. 8-9 each illustrate a sample polyethylene terephthalate strip (PET) 89, 91 having a thickness of about 0.0005 inches. Each micrograph was captured using an Optical Gauging Products (OGP) camera at an 18-× zoom. FIG. 9 is illustrative of a textured surface 13 of a microscopic type.

Referring first to FIG. 8, it can be seen that strip (e.g, a type of film) 89 illustrated therein has a surface 93 which appears visually to be a smooth surface in the micrograph. The PET material shown in FIG. 8 is of the type commonly used in conventional one-way pressure relief valves. The surface 93 of FIG. 8 appears visually to be smooth because surface 93 lacks a textured surface 13 and lacks reservoirs 15. If, as in conventional valves, dry strap 37 second side 63 (i.e., the inner side) and/or base 33, 33a first side 45 (i.e., the inner side) are of the smooth surface 93 type shown in FIG. 8, then any wetting fluid 17 between dry strap 37 and base 33, 33a could under certain circumstances migrate out of the valve causing the aforementioned performance problems.

FIG. 9 illustrates an example of a strip (e.g, a type of film) 91 according to the invention with a textured material 13. In the example of FIG. 9, the polyethylene terephthalate strip 91 has a three-dimensional textured surface 13 unlike the example of FIG. 8. Such textured surface 13 of strip 91 may be considered "roughened" on a microscopic level relative to smooth surface 93 of the strip 89 illustrated in FIG. 10. The three-dimensional textured surface 13 illustrated in FIG. 9 provides reservoirs 15. The textured surface 13 of strip 91 illustrated in FIG. 9 may be implemented as second side 63, of dry strap 37 (FIGS. 4-7 and 10), as first side 45 of base 33, or as both second side 63 of dry strap 37 and first side 45 of base 33 (FIG. 11).

Textured surface 13 illustrated in FIG. 9 may be comprised of outer surface portions 95 and inner surface portions 97 (i.e., that is inner relative to outer surface portions 95). In the examples, outer surface portions 95 provide "protrusions" of textured surface 13 while inner surface portions 97 provide "recesses" in textured surface 13. At least the inner surface portions 97 define wetting fluid reservoirs 15 in the examples. Outer surface portions 95 may also define reservoirs 15, especially in combination with inner surface portions 97.

FIGS. 10-11 schematically illustrate representative microscopic outer surface portions 95 and inner surface portions 97 of textured surfaces 13 and 13a. Outer surface portions 95 and inner surface portions 97 of textured surface 13 may be irregular, or random, as illustrated in FIGS. 10-11. By way of example only, the distance between the outermost portion of the outer surface portions 95 and the innermost portion of the inner surface portions 97 may be in the range of about 0.3 µm to about 12 µm with about 0.3 µm to about 0.5 µm being a preferred range for certain iterations of the valve 10, 10a.

Textured surface 13 and outer and inner surface portions 95, 97 may be formed by various techniques. One such technique is through a chemical etching process. The chemical etching may produce a textured surface 13 with a matte-finish. Other techniques of forming textured surface 13 include plasma treating and laser ablading. Formation of textured surface 13 by means of plasma treating and laser ablading also yields a matte finish representative of the outer and inner surface portions 95, 97 forming reservoirs.

The matte finish of the textured surface 13 may be quantified by reference to its Ra value. As is known, an Ra value is a value representing the average of a set of individual measurements of surface peaks and valleys, in other words an arithmetical mean roughness of a surface. (See ASME B46.1) Such roughness provides reservoirs 15. In embodiments, a surface roughness having matte finish with an Ra value of about 0.25 µm to about 0.4 µm may be implemented.

Valve 10 illustrated in FIG. 10, represents an embodiment in which the second 63, or inner side, of dry strap 37 is provided with reservoirs 15 while base 33 first 45, or inner side, is not. Valve 10a illustrated in FIG. 11 represents an embodiment in which both the second side 63 of dry strap 37 and the first side 45 of base 33a are provided with textured surfaces 13, 13a including reservoirs 15. An embodiment wherein just the first side 45 of the base 33 has a textured surface 13 and the second side 63 of the dry strap 37 does not include a textured surface 13 is also within the scope of the invention. Such an embodiment may simply be a reversed version of the valve 10 illustrated in FIG. 10.

Referring further to FIGS. 10-11, outer surface portions 95 defining reservoirs 15 may be adjacent an opposite surface of valve 10, 10a, such as base 33, 33a first side 45 or dry strap 37 second side 63. Inner surface portions 97 would be spaced from such opposite surfaces of valve 10, 10a. In the examples, the spaces, voids, or small pockets defined by outer surface portions 95 and inner surface portions 97 represent the reservoirs 15 purposed to hold wetting fluid 17. The outer surface portions 95 and inner surface portions 97 forming reservoirs 15 define a volume for holding wetting fluid 17. Unlike conventional valves, if dry strap 37 second side 63 (i.e., the inner side) and/or base 33, 33a first side 45 (i.e., the inner side) are of the textured surface material 13, 13a, then any wetting fluid 17 between dry strap 37 and base 33, 33a can be held in reservoirs 15 thereby limiting or stopping migration of wetting fluid 17 out from between dry strap 37 and base 33, 33a avoiding the previously described problems caused by leakage of wetting fluid 17 from valve 10.

Reservoirs 15 are particularly effective in holding wetting fluid 17 in excess of that required to provide the surface tension between dry strap 37 and base 33, 33a. Holding of excess volumetric amounts of wetting fluid 17 within reservoirs 15 is desirable, for example, if valves 10 are to be stored for any extended period of time before application to package 11. This is because wetting fluid 17 could evaporate and the presence of excess wetting fluid 17 ensures that sufficient wetting fluid 17 is available to plate out between dry strap 37 and base 33, 33a ensuring proper valve 10 operation.

FIGS. 12A-12D illustrate other iterations of textured surfaces 13b, 13c, 13d, 13e which may be used in embodiments of the inventive valve. FIGS. 12A-12D illustrate that microscopic outer surface portions 95 and inner surface portions 97 providing textured surfaces 13b, 13c, 13d, 13e may have reservoirs 15 with a repeated, identical pattern. FIGS. 12A and 12B illustrate that textured surfaces 13b and 13c may comprise 60° (FIG. 12A) or 30° (FIG. 12B) hexagonal reservoirs 15. By way of further example, FIGS. 12C and 12D illustrate that textured surfaces 13d and 13e may comprise tri-helical (FIG. 12C) or 30° (FIG. 12B) channel reservoirs 15. Outer and inner surfaces 95, 97 defining reservoirs 15 of FIGS. 12A-12D may be created by any suitable means, including by laser etching. Combinations of any of the aforementioned textured surfaces may be implemented to provide reservoirs 15 capable of holding wetting fluid 17. FIGS. 9-12D collectively illustrate that reservoirs 15 may be of many different shapes and sizes consistent with the invention.

Wetting Fluid Viscosity

In embodiments, the viscosity of the wetting fluid 17 (e.g., silicone oil, graphite impregnated oil, food grade oil, silicone grease, or other viscous fluid) may be engineered and/or selected to improve retention of wetting fluid 17 within reservoirs 15 to further reduce or eliminate migration of wetting fluid 17 out and away from valve 10. A higher viscosity wetting fluid 17 has a lower flow rate and is less likely to migrate out of valve 10. An example of a viscosity range of wetting fluid 17 may be about 350 centipoise ("cps") to about 100 cps, with a more preferred range being about 150 cps to about 200 cps, and a viscosity of about 180 cps being particularly effective. Food grade silicone grease used as a wetting fluid in some applications can have a viscosity of 300,000 centipoise. The viscosity of wetting fluid 17 can also be selected to adjust and select the target opening pressure of valve 10. The pressure will be greater with more viscous wetting fluids 17 and vice-versa. Wetting fluid 17 viscosity in combination with reservoirs 15 and/or sizing of apertures 53 can enhance retention of wetting fluid 17 within valve 10, 10a.

Other Structure

Referring to FIGS. 1-5, 7, and 13, valve 10 may optionally include bumpers 99, 101 (also sometimes referred to as "rails") on first side 85 (i.e., outer side) of cover 39. Bumpers 99, 101 may be secured to cover 39 by an adhesive 103. Adhesive 103 may be identical to the adhesive provided as adhesive layers 41 and 71 as previously described. If provided, bumpers 99, 101 serve to space dry strap 37 from adjacent packages and objects avoiding application of force to dry strap 37 that could interfere with movement of dry strap 37 to the open position of FIGS. 3 and 5 and providing for improved valve 10, 10a operation.

Release Liner Examples

Figure 13:
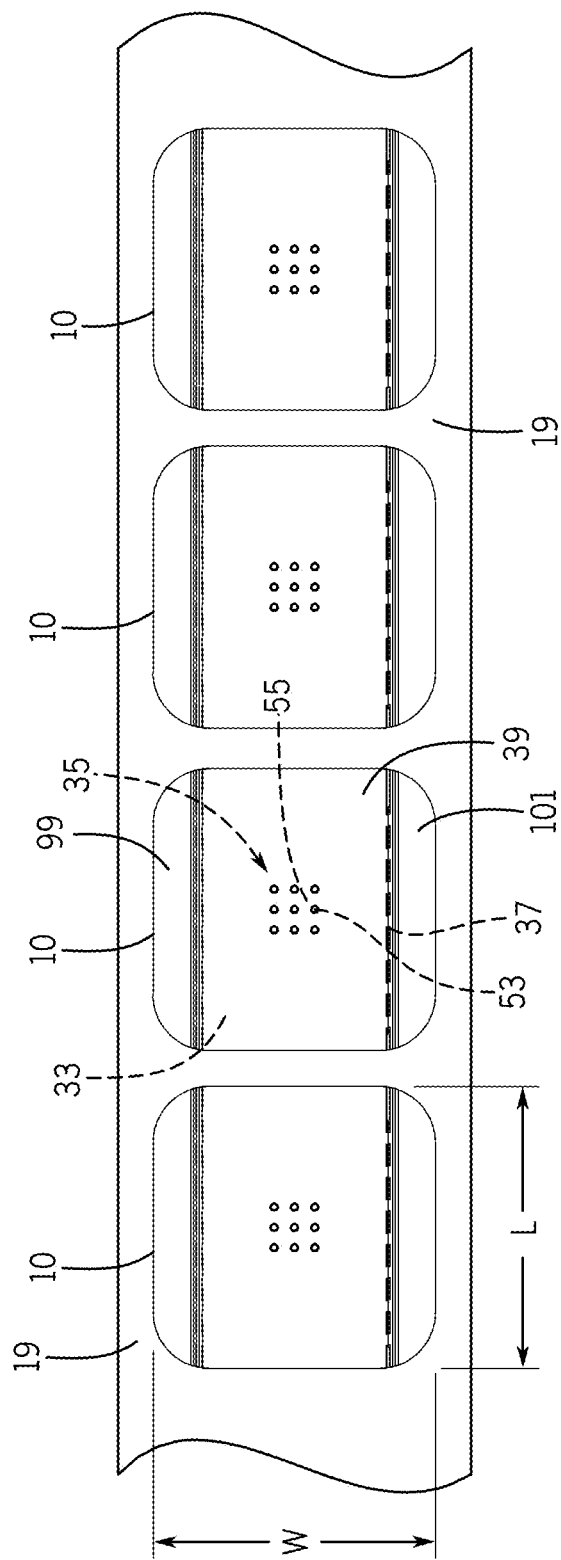
FIG. 13 is a plan view of four pressure relief valves of the type illustrated in FIG. 1 on a release liner and showing certain internal components that would otherwise be hidden to thereby facilitate understanding.

Referring now to FIG. 13, an exemplary series of four pressure relief valves, each indicated as 10 for convenience, are shown mounted on a fragment of a release liner 19. Valves 10a may each be mounted to release liner 19 in an identical manner to that shown in FIG. 13. An advantage of improved valves 10, 10a is that contact between wetting fluid 17 and release liner 19 is limited or eliminated.

Valves 10 may be removed from release liner 19 and may be attached to a package, such as package 11 of FIG. 1. Release liner 19 may be of a material to which adhesive 41 can temporarily attach valves 10 without damaging adhesive 41. Release liner 19 carries pressure relief valves 10 until the valves 10 are removed during the process of attaching valves 10 to packaging, for example by automated application equipment. As illustrated in FIG. 13, valves 10 may be conveniently spaced apart at regular intervals along release liner 19, as for example, at a one inch interval between centers, although the repeat spacing is also dependent on the packaging application.

Biodegradable Valve Examples

In certain "green" applications in which eco-friendly materials are required, it may be desirable for pressure relief valve 10, 10a to be constructed of biodegradable materials, that is materials which will decompose when in a landfill. Where biodegradability is desired, base 33, 33a, dry strap 37, cover 39 and other valve 10 components may be made of polylactic acid, cellulose acetate, or other compostable materials.

Operation

Referring to FIGS. 1-7 and 10-11, operation of valve examples 10, 10a will now be described. In operation, pressure relief valve 10, 10a is initially in a first, or closed, state similar to that shown in FIGS. 2, 4, 6, and 10-11. In this closed state of the examples, dry strap 37 second side 63 may abut base 33, 33a first side 45 with wetting fluid 17 surrounding vent 35. Wetting fluid 17 provides surface adhesion between dry strap 37 and base 33, 33a and cover 39 provides a force which serves to urge dry strap 37 sealingly against base 33, 33a blocking movement of gas through vent 35 and preventing ambient air from entering package 11, thereby preserving the freshness of coffee 21 or other material inside package 11.

In the examples of pressure-relief valve 10, 10a, when pressure inside package 11 builds to exceed the predetermined and known target pressure, valve 10, 10a will at least partially open to allow gas to escape from package 11 and through valve 10, 10a (via gas passageway 49). In the embodiments of valves 10, 10a, force applied through vent 35 and against dry strap 37 causes at least partial separation of dry strap 37 from base 33, 33a first surface 45 so that valve 10, 10a is in the open state such as in the examples of FIGS. 3 and 5 as previously described. For both valves 10, 10a, flexure of cover 39 may allow complete, partial, or undulating separation of plural-part dry strap 37 from base 33, 33a to open gas flow path 49, allowing gas to escape from package 11 when valve 10, 10a is in the open state.

Most typically, there will be a gradual undulating movement of dry strap 37 as individual gas bubbles pass between dry strap 37 and base 33, 33*a*.

As illustrated in the examples of FIGS. 10-12D, each textured surface 13 and fluid reservoirs 15 therein may provide storage spaces for wetting fluid 17. Wetting fluid 17 that might otherwise migrate out of valve 10, 10*a* would be retained in reservoirs 15 avoiding leakage. Reservoirs 15 further provide a means to reduce pressure on wetting fluid 17 applied by dry strap 37 and base 33, 33*a* that might otherwise accelerate wetting fluid 17 flow out of valve 10, 10*a*. Textured surface 13 and reservoirs 15 alone mitigate or eliminate wetting fluid 17 leakage from valve 10, 10*a*.

An advantage of certain valve embodiments 10, 10*a* is that reservoirs 15 provide an opportunity to utilize a volumetric lesser amount of wetting fluid 17 as compared with conventional valves lacking reservoirs. Relatively less wetting fluid 17 may be utilized because the wetting fluid 17 does not migrate out from the valve. Accordingly, excessive amounts of wetting fluid 17 provided in anticipation of leakage are unnecessary. Implementation of a lesser amount of wetting fluid 17 is desirable because the risk of leakage is minimized by the presence of lesser amounts of the wetting fluid 17.

Other optional features of valve 10, 10*a* as described herein may facilitate improved retention of wetting fluid 17 within valve 10, 10*a* or may serve to mitigate the effect of any potential leakage of wetting fluid 17. For instance, selection of an adhesive 41, 71, 103 with oleophobic properties which is resistant to contamination by wetting fluid 17 will further avoid any loss of adhesion should wetting fluid 17 come into contact with such adhesive 41, 71, 103. By way of further example, sizing of apertures 53 with small area sizes may serve to limit or restrict movement of wetting fluid 17 through those apertures 53 and through base 33, 33*a*. Limiting of wetting fluid 17 migration through apertures 53 avoids or minimizes any contamination of adhesive 41 and lessening of adhesion holding valve 10, 10*a* on release liner 19 or on package 11. As yet another optional improvement, wetting fluid 17 viscosity can be engineered to lessen or slow the flow of wetting fluid 17 out of valve 10 and onto second side 85 of cover 39 or package 11 exterior surface 27. A greater viscosity would limit the flow of wetting fluid 17. Valve 10, 10*a* including textured surfaces 13 alone is sufficient to limit or eliminate migration of wetting fluid 17 out from valve 10, 10*a*. Implementation of any of the aforementioned optional features may lead to enhanced operation in certain embodiments and applications.

As illustrated in FIGS. 3 and 5, an increase in differential pressure within package 11 above ambient pressure by a predetermined and known target pressure causes the previously closed valve 10, 10*a* to open and to enter the open state. As previously described, the flexure of cover 39 and dry strap 37 may be of an undulating-type or burping-type, permitting single bubbles of gas to escape from package 11 through valve 10. Such undulating movement would result from portions of dry strap 37 remaining in sealing contact with base 33, 33*a* (with sealing improved by surface tension provided by wetting fluid 17) while there is separation between dry strap 37 and base 33, 33*a* to accommodate a bubble of gas therebetween.

When the differential pressure within package 11 decreases below a predetermined and known target pressure, cover 39 applies a force as it returns to its original position. In the embodiments of valves 10, 10*a*, the force causes dry strap 37 to be relocated fully against base 33, 33*a* with wetting fluid 17 plated out therebetween, closing vent 35 and returning pressure relief valve 10 to the closed state of FIGS. 2, 4, 6, and 10-11.

The process of opening and closing pressure relief valve 10, 10*a* is repeated when differential pressure inside package 11 again exceeds the target opening pressure and can continue until all of the coffee 21 or other gas-producing material is removed from package 11.

The foregoing description is provided for the purpose of explanation and is not to be construed as limiting the invention. While the invention has been described with reference to preferred embodiments or preferred methods, it is to be understood that the words which have been used herein are words of description and illustration, rather than words of limitation. Section headings are non-limiting and are provided for the reader's convenience only. Furthermore, although the invention has been described herein with reference to particular structure, methods, and embodiments, the invention is not intended to be limited to the particulars disclosed herein, as the invention extends to all structures, methods and uses that are within the scope of the appended claims. The disclosed one-way pressure relief valves may address some or all of the problems previously described.

A particular embodiment need not address all of the problems described, and the claimed pressure relief valves should not be limited to embodiments comprising solutions to all of these problems. Further, several advantages have been described that flow from the structure and methods; the present invention is not limited to structure and methods that encompass any or all of these advantages. Those skilled in the relevant art, having the benefit of the teachings of this specification, may effect numerous modifications to the invention as described herein, and changes can be made without departing from the scope and spirit of the invention as defined by the appended claims. Furthermore, any features of one described embodiment can be applicable to the other embodiments described herein.

What is claimed is:

1. A pressure relief valve with wetting fluid reservoirs comprising:
    a base having a first side, a second side, an area, a peripheral edge, and a vent extending entirely through the base;
    a cover overlying the base, the cover having a first side, a second side, an area, a peripheral edge, and opposite end portions secured with respect to the base;
    a dry strap between the base and cover overlying the entire vent and having a second side facing and at least partially abutting the first side of the base;
    at least one microscopically textured surface on the second side of the dry strap facing the base, or on the first side of the base facing the dry strap, or on both the first side of the base and the second side of the dry strap, the at least one microscopically textured surface defining a plurality of fluid-holding reservoirs; and
    a wetting fluid disposed within the plurality of reservoirs and between the dry strap and the base entirely around the vent.

2. The pressure relief valve of claim 1 wherein just the second side of the dry strap has the at least one textured surface.

3. The pressure relief valve of claim 1 wherein the at least one textured surface and plurality of fluid-holding reservoirs define surface peaks and valleys with dimensions between the peaks and valleys in the range of about 0.3 μm to about 12 μm.

4. The pressure relief valve of claim 1 wherein the at least one textured surface has outer surface portions and inner surface portions and at least the inner surface portions define the plurality of fluid-holding reservoirs.

5. The pressure relief valve of claim 4 wherein the plurality of fluid-holding reservoirs defined by at least the inner surface portions have a volume.

6. The pressure relief valve of claim 4 wherein the outer surface portions and the inner surface portions of the at least one textured surface are irregular.

7. The pressure relief valve of claim 4 wherein the outer surface portions and the inner surface portions of the at least one textured surface are of a regular repeating pattern.

8. The pressure relief valve of claim 4 wherein the base, the dry strap, and the cover are of a material selected from the group consisting of polyethylene, polypropylene, and polyester.

9. The pressure relief valve of claim 4 wherein the at least one textured surface has a matte-finish appearance.

10. The pressure relief valve of claim 9 wherein the matte-finish appearance is selected from the group consisting of a chemically-etched type, a plasma-treated type, and a laser-abladed type.

11. The pressure relief valve of claim 4 wherein the base, the cover, and the dry strap each have a width with the width of the dry strap being less than the width of the base and cover and an adhesive secures the dry strap to the cover and the opposite ends of the cover to the first side of the base on opposite sides of the dry strap.

12. The pressure relief valve of claim 11 wherein the dry strap has a length in a second direction sufficient to extend proximate opposite peripheral edges of the cover.

13. The pressure relief valve of claim 12 wherein the peripheral edges of the base and the cover are aligned and the dry strap has a length sufficient to extend proximate the aligned opposite edges of both the cover and the base.

14. The pressure relief valve of claim 4 further including an adhesive on the second side of the base and the adhesive is selected from the group consisting of pressure-sensitive adhesives (PSAs), heat-activated adhesives, ultra-violet cured adhesives, water-based adhesives, solvent-based adhesives, and rubber-based adhesives.

15. The pressure relief valve of claim 14 wherein the adhesive is of an oleophobic type.

16. The pressure relief valve of claim 15 wherein the wetting fluid is selected from the group consisting of silicone oil, graphite-impregnated oil, food grade oil, and food grade silicone grease.

17. The pressure relief valve of claim 16 wherein the wetting fluid is present in an amount of about 1.5 µL to about 2.3 µL.

18. The pressure relief valve of claim 16 wherein the wetting fluid has a viscosity of about 100 centipoise to about 350 centipoise.

19. The pressure relief valve of claim 18 wherein the vent is defined by a plurality of aperture and barrier portions.

20. The pressure relief valve of claim 19 wherein the barrier portions defining the apertures are spaced apart by about 0.020 inches or less.

* * * * *